United States Patent [19]
Thaler

[11] 3,794,045
[45] Feb. 26, 1974

[54] PASSIVE HYSTERESIS CIRCUIT DEMAND PACER

[75] Inventor: Sherwood S. Thaler, Lexington, Mass.

[73] Assignee: American Optical Corporation, Southbridge, Mass.

[22] Filed: Dec. 6, 1971

[21] Appl. No.: 205,196

[52] U.S. Cl............................. 128/419 P, 128/422
[51] Int. Cl.............................................. A61n 1/36
[58] Field of Search. 128/419 P, 421, 422; 331/113, 331/178, 65

[56] References Cited
UNITED STATES PATENTS
| | | | |
|---|---|---|---|
| 3,693,626 | 9/1972 | Cole | 128/419 P |
| 3,661,157 | 5/1972 | Fyson et al. | 128/419 P |
| 3,593,718 | 7/1971 | Krasnev et al. | 128/419 P |
| 3,677,251 | 7/1972 | Bowers | 128/419 P |

Primary Examiner—William E. Kamm
Attorney, Agent, or Firm—Joel Wall; William C. Nealon

[57] ABSTRACT

There is disclosed a demand pacer which exhibits rate hysteresis without requiring additional active elements. The reference potential, to which the voltage across a timing capacitor is compared, is derived from the tap on a voltage divider, with an additional capacitor being connected across one branch of the voltage divider. Whenever the voltage across the timing capacitor exceeds the reference voltage, the pacer is triggered and the capacitor in the voltage divider circuit discharges slightly. This lowers the reference voltage so that the escape interval is shortened. The escape interval gets shorter and shorter during successive cycles when stimulating pulses are generated until a lower limit is reached. If successive spontaneous beats are detected, the capacitor continuously charges until the escape interval is at the maximum limit. It requires 2–6 seconds for the escape interval to change from one extreme to the other.

14 Claims, 2 Drawing Figures

PASSIVE HYSTERESIS CIRCUIT DEMAND PACER

This invention relates to demand pacers, and more particularly to passive hysteresis circuits for use therein.

A conventional demand pacer provides electrical heart-stimulating pulses to a patient's heart only in the absence of natural heartbeats. If only a single natural heartbeat is absent, only a single electrical pulse is provided. If more than one natural heartbeat is missing, a corresponding number of electrical pulses is provided. No matter how many electrical stimuli are generated, they occur at approximately the same time spacing from each other and from the last natural heartbeat as would be the case if they were all natural heartbeats.

A typical demand pacer is arranged normally to generate electrical pulses at predetermined time intervals approximately at the rate of the natural heartbeats. Upon the detection of a natural heartbeat, the next electrical stimulus which would otherwise be generated is inhibited. At the same time, the apparatus restarts its timing cycle so that the next electrical pulse will be generated (if needed) after the predetermined time interval has elapsed, starting with the heartbeat just detected. The result is an overall "integrated" operation, i.e., a mutually exclusive cooperation of natural heartbeats and stimulating pulses.

In the case of a pacer designed to stimulate heartbeats at a 72 beat-per-minute rate (corresponding to an inter-beat interval of 833 milliseconds), the pacer may be provided with a capacitor charging circuit. The capacitor is discharged whenever a spontaneous beat is detected or a stimulating pulse is generated. The capacitor then starts to charge toward a firing level which is reached after 833 milliseconds. If a spontaneous beat is not detected within 833 milliseconds of the previous beat, a stimulating pulse is generated and a new timing cycle begins. On the other hand, if a spontaneous beat is detected within the 833 milliseconds timing period, the capacitor is discharged so that a stimulating pulse is not generated, and a new timing cycle begins.

In a demand pacer exhibiting rate hysteresis, the operation is slightly different. The pacer might be designed so that it does not generate pulses provided spontaneous beats take place at a rate no less than 62 per minute. However, once the pacer is allowed to generate a stimulating pulse, succeeding pulses are generated at a faster rate, for example, at a rate of 72 beats per minute. The lower rate corresponds to an inter-beat interval of 968 milliseconds. While the heart is beating normally, the pacer waits 968 milliseconds to see if a spontaneous beat occurs; only after 968 milliseconds have elapsed without a spontaneous beat having taken place does the pacer generate a stimulating pulse. But once it does so, the pacer no longer waits for 968 milliseconds before another pulse is generated; instead, it waits only 833 milliseconds to see if a spontaneous beat occurs. If a spontaneous beat does not occur within this shorter time interval, a stimulating pulse is generated. Thus, once the pacer has fired once, the heart is stimulated at the faster rate of 72 beats per minute. It is only when a spontaneous beat is detected before 833 milliseconds have expired subsequent to the previous beat that the pacer inhibits the generation of the next stimulating pulse and the timing circuit is switched so that the "waiting" period is extended back to 968 milliseconds. For patients with a variety of conditions, it has been determined that pacers exhibiting rate hysteresis are preferable.

In a typical demand pacer in which rate hysteresis is provided, the change in the escape interval can be controlled by changing the reference voltage to which the voltage across a (timing) charging capacitor is compared. While the heart is beating normally, the reference voltage is at a higher level; it requires a relatively long time for the capacitor voltage to reach the firing (reference threshold) level. On the other hand, as soon as a stimulating pulse has been generated, the reference voltage is lowered. This allows the capacitor voltage to reach the threshold level in less time. The change in reference voltage can be effected by providing an active (transistor) circuit which is turned on and off depending upon whether the last beat was spontaneous or stimulated. For example, the active device might be on whenever the previous beat was spontaneous, in which case it would boost the reference voltage to a slightly higher level.

The major problem with prior art pacers exhibiting rate hysteresis is that additional active devices are required. The reliability of any electronic system, and pacers in particular, decreases as the number of components — and especially the number of active components — increases. Thus there is a greater liklihood of failure in a demand pacer exhibiting rate hysteresis than there is in a demand pacer which does not.

It is a general object of my invention to provide a rate hysteresis circuit for a demand pacer which does not require additional active components.

Some prior art rate hysteresis pacers operate in the snap-action mode described above — the escape interval is lengthened suddenly whenever a spontaneous beat is detected while the pacer is operating in the pacing mode, or the escape interval is shortened suddenly whenever the heart has been beating naturally and a missing beat is detected. However, in other rate hysteresis pacers the change in escape interval is gradual. For example, while the heart is beating naturally the escape interval might be 968 milliseconds. If 968 milliseconds expire without a spontaneous beat being detected, a stimulating pulse is generated and the escape interval might drop down to 912 milliseconds. If a spontaneous beat is not detected within the next 912 milliseconds, another stimulating pulse is generated and the escape interval might drop down to 870 milliseconds. If during the next 870 milliseconds a spontaneous beat is not detected, another stimulating pulse is generated and the escape interval might drop down to the final lowest value of 833 milliseconds. Thereafter, stimulating pulses are generated at intervals of 833 milliseconds in the absence of a spontaneous beat which occurs less than 833 milliseconds after the previous stimulating pulse.

Conversely, if while the pacer is operating in the pacing mode a spontaneous beat is detected, the escape interval might be lengthened from 833 milliseconds to 870 milliseconds. If another spontaneous beat is then detected within 870 milliseconds, the escape interval might be lengthened to 912 milliseconds. Finally, the escape interval might be lengthened to the maximum of 968 milliseconds if a third successive beat is detected within 968 milliseconds after the second. The gradual change in the escape interval can be controlled by gradually changing the reference voltage depending upon the sequence of spontaneous and stimulated beats. Gradual changes of this type are desired because slow changes in heart rate are preferable to fast changes. However, the circuitry necessary to accomplish a gradual change in escape interval is generally even more complex than that required to effect a sudden change in escape interval.

It is another object of my invention to provide a circuit for controlling a gradual change in escape interval which does not require any active components and which requires a minimum number of passive components.

In a typical prior art pacer, the reference voltage for the timing circuit is derived by a voltage divider. The voltage divider tap is connected to one input of a transistor comparator switch. The charging capacitor is coupled to another terminal of the transistor switch. The capacitor charges from a voltage source and whenever the voltage across it exceeds the tap voltage by the triggering potential of the switch, the switch fires, the capacitor discharges through it, and the switch current causes a stimulating pulse to be generated. On the other hand, if a spontaneous heat is detected before the capacitor voltage has reached the firing level, the capacitor is discharged through an alternate switch and then starts to charge once again.

In the illustrative embodiment of my invention, an additional capacitor is placed across one of the two branches of the voltage divider. While the heart is beating normally, the voltage across this capacitor is determined by the relative impedances of the two branches of the voltage divider. If a spontaneous beat is not detected by the time the charging capacitor has reached the firing level, the transistor switch turns on and a pulse is stimulated as described above. Because the reference voltage capacitor is connected to a terminal of the switch, the capacitor discharges slightly through the switch before the switch turns off. As a result, the reference voltage drops slightly. Although the capacitor in the reference voltage circuit then starts to charge through the voltage divider toward the maximum reference voltage value, the reference voltage does not reach the maximum value in a single cycle. Consequently, the difference between the reference voltage and the charging capacitor voltage decreases to the firing level of the switch in less than the maximum pacer inter-beat interval. If a spontaneous beat is not detected within this shortened escape interval, another stimulating pulse is generated and the capacitor discharges still further through the transistor switch. During each of a few successive cycles the reference voltage capacitor discharges to lower and lower levels until a steady-state condition is reached while results in the minimum pacer inter-beat interval. Conversely, once spontaneous beats are detected, the transistor switch is not operated and the reference voltage capacitor continues to charge. After a few natural beats are detected, the reference voltage capacitor has charged to the maximum value (determined by the relative impedances of the two branches of the voltage divider), and the pacer automatically waits for the maximum inter-beat interval between spontaneous heartbeats before a stimulating pulse is generated.

It is a feature of my invention to derive a reference voltage for a prior art type pacer timing circuit through a voltage divider, and to connect a capacitor to the reference voltage input of the switch which functions to compare the voltage across a charging capacitor to the reference voltage.

Further objects, features and advantages of my invention will become apparent upon consideration of the following detailed description in conjunction with the drawing, in which.

Figure 1:
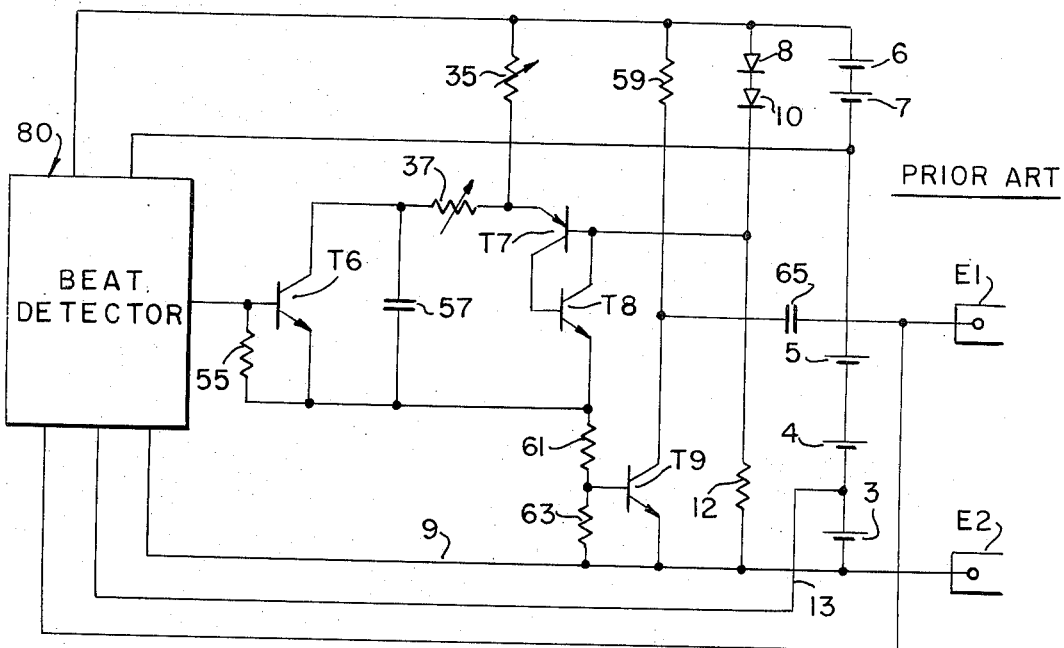
FIG. 1 depicts a prior art demand pacer.

The prior art pacer of FIG. 1 is disclosed in Berkovits application Ser. No. 10,225, entitled Safe-Rate Pacer and filed on Feb. 10, 1970. This application has matured into U.S. Pat. No. 3,635,224. Only those parts of the circuit are shown in detail which are required for an understanding of the present invention. Block 80 in FIG. 1 performs the functions of a large group of circuits in the Berkovits pacer. The main object of the beat detector 80 is to detect a signal on electrodes E1 and E2 when a spontaneous beat occurs, and to apply a trigger pulse in response thereto to the base of transistor T6.

The power supply for the pacer consists of five batteries 3–7 connected in series. Beat detector 80 requires three bias voltages which are derived from the five individual batteries includes in the pacer. The bias voltages are taken from the junction of batteries 3 and 4 (to which conductor 13 is connected), the junction of batteries 5 and 7, and from all five batteries connected in series. Electrodes E1 and E2 are connected over conductors 9 and 11 to the beat detector, and the beat detector, when a signal on electrodes E1 and E2 is detected, applies a positive pulse to the base of transistor T6. Resistor 55 is a biasing resistor for the transistor.

Capacitor 57 is the timing capacitor and charging current flows from the five batteries connected in series through potentiometers 35 and 37, the capacitor, and resistors 61 and 63. The charging current is sufficiently small so that the voltage across resistor 63 does not turn on transistor T9. Diodes 8 and 10 and resistor 12 are connected in series across the batteries, and the voltage at the junction of diode 10 and resistor 12 is the reference voltage which is extended to the base of transistor T7 and the collector of transistor T8. The reference voltage is equal to the maximum supply voltage, less the drops across diodes 8 and 10. Between stimulating pulses, capacitor 65 charges through the electrodes, the charging path including the batteries, resistor 59, the capacitor, the two electrodes and the heart tissue. The left side of the capacitor charges positively and, when a stimulating pulse is required and transistor T9 conducts, current flows from the capacitor through transistor T9, the electrodes and the heart tissue.

Whenever a spontaneous beat is detected, transistor T6 conducts and capacitor 57 is discharged through it. A new charging cycle then begins. The settings of the two potentiometers control the magnitude of the charging current, and therefore the escape interval. Whenever the voltage across capacitor 57 exceeds the voltage at the base of transistor T7 (the reference voltage) by the voltage necessary to forward bias transistor T7, the transistor turns on. Conduction of transistor T7 turns on transistor T8. With the two transistors conducting, current flows through potentiometer 35, the two transistors, and resistors 61 and 63. The voltage across resistor 63 is sufficient to turn on transistor T9, and current flows from the batteries through resistor 59 and the transistor. With transistor T9 turned on, capacitor 65 discharges through it to provide the necessary stimulating pulse. The width of the stimulating pulse is determined by the setting of potentiomtter 37. Capacitor 57 discharges through the potentiometer and transistors T7 and T8. The transistors conduct only as long as discharge current flows from the capacitor. When the current falls to a level insufficient for maintaining conduction of the transistors, they turn off. Current no longer flows from the battery supply through the transistors, and resistors 61 and 63, and the pulse terminates. At this time capacitor 65 charges once again in preparation for another stimulating pulse and a new charging interval begins.

It is apparent that the reference voltage at the base of transistor T7 is determined solely by the voltage divider which comprises diodes 8 and 10, and resistor 12. The reference potential is equal to the full battery supply, less the drops across the diodes. The reference potential does not vary (other than to a negligible extent) with conduction of transistors T7 and T8. The escape interval is relatively constant and does not vary substantially depending upon whether the previous beat was spontaneous or stimulated, that is, whether capacitor 57 discharged through transistor T6, or transistors T7 and T8.

Figure 2:
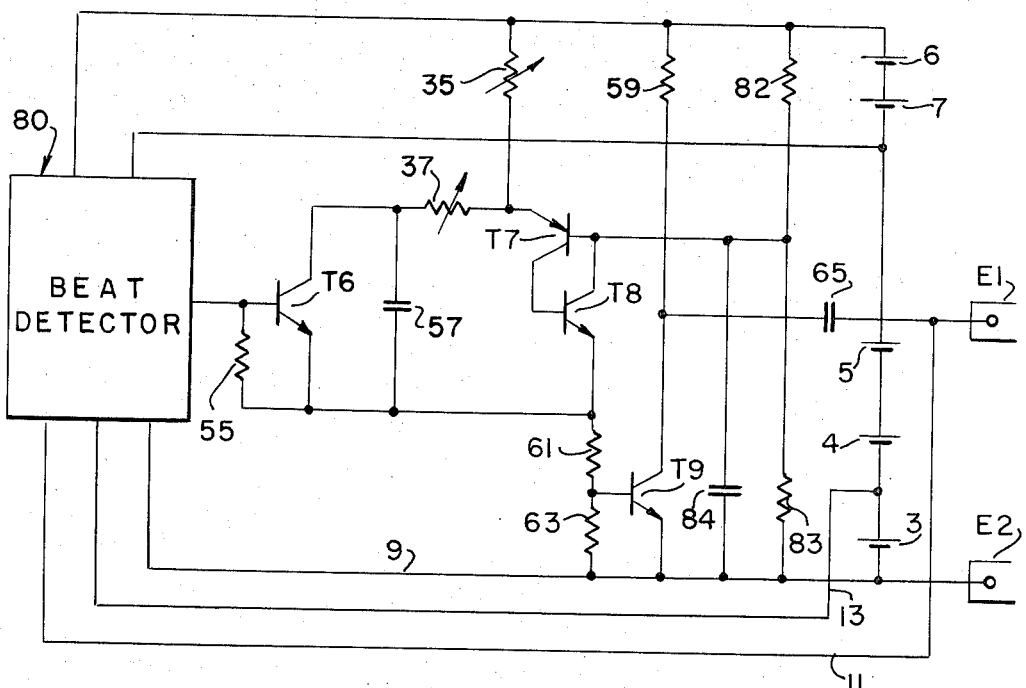
FIG. 2 depicts the illustrative embodiment of my invention.

The pacer of FIG. 2 for the most part is almost identical to that of FIG. 1. However, the voltage divider (diodes 8 and 10, and resistor 12) of FIG. 1 is replaced by a voltage divider comprising resistors 82 and 83, and an additional capacitor 84. These are the only elements required to provide a rate hysteresis operating characteristic for the pacer of FIG. 1. These few elements, none of which are active, not only provide a rate hysteresis type operation, but in addition they provide that kind of operation in which the escape interval changes gradually over a number of cycles from one extreme to another.

In the circuit of FIG. 2, the base of transistor T7 is no longer held at a fixed potential. If transistors T7 and T8 have not turned on during several cycles of operation, the reference potential at the base of transistor T7 is the largest possible and is determined by the relative impedances of resistors 82 and 83. Capacitor 84 is charged to a level such taht the voltage across it equals the steady-state voltage across resistor 83. Potentiometer 35 is adjusted such that it requires 950 milliseconds for capacitor 57 to charge to the level required to turn on transistors T7 and T8. If 950 milliseconds go by without the detection of a spontaneous beat, transistors T7 and T8 turn on and a stimulating pulse is generated.

But at the same time that capacitor 57 discharges through transistors T7 and T8, capacitor 84 discharges slightly through the same transistors and resistors 61 and 63. Consequently, when transistors T7 and T8 turn off (after conducting for an interval determined by the setting of potentiometer 37), the voltage across capacitor 84 is slightly less than it was prior to the turning on of the transistors. Capacitor 84 starts to charge once again from current which flows from the batteries through resistor 82. However, it requires in excess of one second for the capacitor voltage to rise to the level at which it was prior to the generation of the stimulating pulse. Consequently, capacitor 57 has to charge for less than 950 milliseconds before it reaches the new (lower) firing level. The new escape interval is determined by the initial voltages of capacitors 57 and 84 and their rates of charge. Another stimulating pulse is generated if a spontaneous beat is not detected by the time the voltage across capacitor 57 exceeds the voltage across capacitor 84 by that potential difference required to fire transistor T7. If another spontaneous beat is not detected, transistors T7 and T8 turn on and capacitor 84 discharges once again through them, along with capacitor 57. By the end of the stimulating pulse, the voltage across capacitor 84 is even lower than it was at the end of the previous stimulating pulse. Although capacitor 84 starts to charge once again by the current which flows through resistor 82, it now takes even less time for capacitor 57 to reach the new firing level. Every stimulating pulse causes another incremental drop in the voltage across capacitor 84, with the final voltage across the capacitor at the end of each stimulating pulse getting lower and lower with successive pulses. The magnitudes of the incremental steps, however, decrease because the voltage across capacitor 84 at the start of each stimulating pulse gets lower and lower during successive cycles. Eventually, after several cycles, a steady-state condition is reached; stimulating pulses are generated at a fixed rate with interbeat intervals of 800 milliseconds. (It should be understood that the two extreme time periods of 950 milliseconds and 800 milliseconds can be selected to be other than these two values by the appropriate choice of component values for capacitor 84, resistors 82 and 83, and potentiometer 35.)

Similarly, as soon as spontaneous beats are detected, transistors T7 and T8 do not turn on and the voltage across capacitor 84 continues to rise until it reaches the maximum value of the reference voltage (determined by the relative magnitudes of resistors 82 and 83). At this time, the escape interval is of maximum duration (950 milliseconds).

It should be noted that the escape interval changes gradually even if spontaneous and stimulated beats are interspersed. For example, two stimulated beats might occur, which result in a decreased escape interval but not the shortest possible escape interval, after which a spontaneous beat allows the escape interval to continue to increase because the charging of capacitor 84 is not interrupted, although the escape interval does not reach the maximum value until after several natural beats have been detected. In general, it requires several beats of the same type (stimulated or natural) to control switching of the escape interval from one extreme to the other. Whenever there is a change in pacer operation, the escape interval increases or decreases toward one of the two limits. The provision of capacitor 84, connected to the reference voltage input of the transistor switch (comparator), causes the pacer to exhibit gradual changes in rate hysteresis, without the need for any additional components and with a minimum number of passive components.

Preferably, the value of the capacitor should be such that it requires 2–6 seconds of continuously generated stimulating pulses for the pacer rate to speed up from 62 beats per minute to 72 beats per minute.

It is also possible to connect capacitor 84 across resistor 82, rather than to connect it across resistor 83. With the capacitor connected across resistor 82, the voltage across the capacitor increases whenever transistors T7 and T8 conduct, since current flows from the batteries through the capacitor and the transistor switch. An increase in the voltage across the capacitor (resistor 82) results in a decrease across resistor 83 and the lowering of the reference voltage. Thus the circuit operation is substantially the same no matter which resistor the capacitor is connected across. This is as expected because as far as the AC analysis of the ircuit is concerned, the batteries (if ideal) can be considered as a short circuit and therefore the same circuit results whether the capacitor is returned to the positive terminal of battery 6 or the negative terminal of battery 3.

The reason for replacing diodes 8 and 10 of FIG. 1 with resistor 82 of FIG. 2 is that if diodes 8 and 10 were used, the drop across them would be relatively constant and consequently the reference potential would be fixed. It should be noted that there is no voltage across capacitor 84 before the entier circuit is turned on. Consequently, transistors T7 and T8 might initially turn on and remain on as a result of the low potential applied to the base of transistor T7. For this reason, in some cases it may be desirable to include a series string of diodes such as diodes 8 and 10 connected between the positive terminal of battery 6 and the base of transistor T7; the diodes would ensure that the base of transistor T7 is initially at a high enough level to prevent the continuous conduction of transistors T7 and T8. After capacitor 84 has charged, even though the voltage across the capacitor changes as described above, both limits are high enough such that the starting diodes do not conduct during subsequent pacer operation. Furthermore, even if these diodes do conduct slightly, they do not affect the operation as described above other than to a negligible extent. In most cases, it has been found that the starting diodes are not even necessary and for this reason they are not shown in FIG. 2.

Although the invention has been described with reference to a particular embodiment it is to be understood that this embodiment is merely illustrative of the application of the principles of the invention. For example, in an atrial and ventricular pacer, in which stimulating pulses are supplied to atrial electrodes as well as to ventricular electrodes, comparable circuits can be utilized. Thus it is to be understood that numerous modifications may be made in the illustrative embodiment of the invention and other arrangements may be devised without departing from the spirit and scope of the invention.

What I claim is:

1. A pacer comprising electrode means for connection to a patient's heart, pulsing means for applying a stimulating pulse to said electrode means, means for detecting a signal on said electrode means responsive to a beating of said patient's heart, switch means having first and second terminals, means responsive to the detection of a beating action of said patient's heart for causing the voltage at said first terminal to start rising continuously from an initial low lever, means for applying a reference potential to said second terminal, means responsive to the voltage at said first terminal exceeding the voltage at said second terminal by an amount sufficient to trigger said switch means for controlling the operation of said pulsing means, and passive reference potential changing means connected to said second terminal for alone decreasing said reference potential responsive to each triggering of said switch means and for continuously increasing said reference potential until a predetermined maximum value is reached in the absence of the triggering of said switch means.

2. A pacer in accordance with claim 1 wherein said reference potential applying means includes a potential source, voltage divider means connected across said potential source and having a tap thereon, and means for connecting said tap to said second terminal, and said passive reference potential changing means includes capacitor means coupled between said second terminal and one end of said voltage divider means.

3. A pacer in accordance with claim 2 wherein said voltage divider means and said passive reference potential changing means control said reference potential to vary between two extreme limits, and the magnitude of said capacitor means is selected to provide a time constant that requires at least two seconds for the reference potential to change from one extreme limit to the other in the presence of continuously generated stimulating pulses or the presence of continuously detected spontaneous beats of said patient's heart.

4. A pacer in accordance with claim 1 wherein said passive reference potential changing means includes means for causing said reference potential to change from one extreme limit to the other in no less than two seconds in the presence of continuously generated stimulating pulses or in the presence of continuously detected spontaneous beats.

5. A pacer in accordance with claim 4 wherein said passive reference potential changing means includes means for causing said reference potential to change from one extreme limit to the other in no more than six seconds in the presence of continuously generated stimulating pulses or in the presence of continuously detected spontaneous beats.

6. A pacer comprising electrode means for connection to a patient's heart, pulsing means for applying a stimulating pulse to said electrode means, means for detecting a beating of said patient's heart, first and second terminals, means responsive to a beating action of said patient's heart for causing the voltage at said first terminal to start changing continuously in the same direction from an initial level at one extreme toward a final level at another extreme, means for applying a reference potential to said second terminal, comparator means responsive to the voltages at said first and second terminals differing from each other by less than a predetermined amount for controlling the operation of said pulsing means, and passive means for alone changing in a first direction the reference potential of said second terminal responsive to each operation of said comparator means and for then continuously and gradually restoring in the direction opposite to said first direction said reference potential.

7. A pacer in accordance with claim 6 wherein said reference potential applying means includes a potential source, voltage divider means connected across said potential source and having a tap thereon, and means for connecting siad tap to said second terminal, and said passive reference potential changing means includes capacitor means coupled between said second terminal and one end of said voltage divider means.

8. A pacer in accordance with claim 7 wherein the magnitude of said capacitor means is selected to provide a time constant that requires at least two seconds for said reference potential to be restored in the presence of continuously detected spontaneous beats of said patient's heart.

9. A pacer in accordance with claim 6 wherein said passive reference potential varies between two limits and said reference potential changing means includes means for causing said reference potential to change from one limit to the other in no less than 2 seconds in the presence of continuously generated stimulating pulses or in the presence of continuously detected spontaneous beats.

10. A pacer in accordance with claim 9 wherein said passive reference potential changing means includes means for causing said reference potential to change from one extreme limit to the other in no more than six seconds in the presence of continuously generated stimulating pulses or in the presence of continuously detected spontaneous bests.

11. A pacer comprising electrode means for connection to a patient's heart, pulsing means for generating a stimulating pulse on said electrode means, means for deriving a reference potential, means for deriving a timing potential which changes continuously in the same direction from an initial value starting with the occurrence of a beating action of said patient's heart, means responsive to a predetermined difference between said timing and reference potentials for operating said pulsing means, and passive means operative alone when a stimulating pulse is generated on said electrode means for first controlling a change in said reference potential in one direction and then controlling a gradual and continuous change in it in the opposite direction.

12. A pacer in accordance with claim 11 wherein said reference potential can vary between two extreme limits and said passive means controls a change in said reference potential from one extreme limit to the other extreme limit in no less than 2 seconds.

13. A pacer in accordance with claim 11 wherein said reference potential can vary between two extreme limits and said passive means controls a change in said reference potential from one extreme limit to the other extreme limit in no more than 6 seconds.

14. A demand pacer for stimulating the heart of a patient comprising terminal means for connection to said heart, heartbeat detection means connected to said terminal means for detecting the presence and absence of a spontaneous heartbeat within a first predetermined interval from the most previous heartbeat, pulse generating means responsive to the operation of said detection means detecting the absence of said spontaneous heartbeat for benerating a stimulation impulse on said terminal means, and passive-component gradual-interval-variation control means responsive to the operation of said pulse generating means for alone controlling each interval between successive stimulation impulses to be progressively less than the most previous interval but not to be less than a second predetermined interval and responsive to the operation of said detecting means detecting the presence of each successive said spontaneous heartbeat for alone controlling each interval between each successive said spontaneous heartbeat and the next stimulation impulse to be progressively more than the most previous interval but no greater than said first predetermined interval.

* * * * *